Patented Mar. 20, 1923.

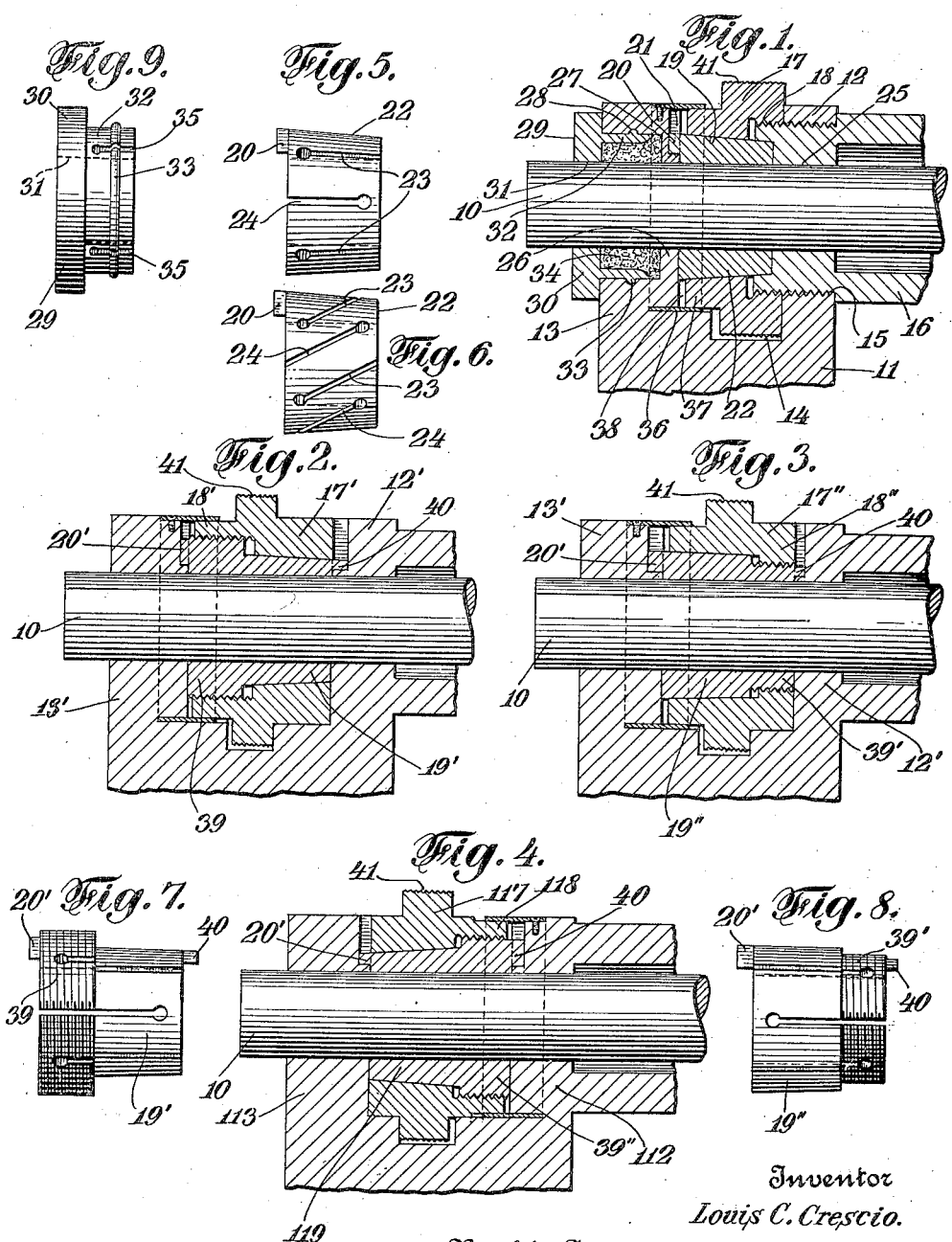

1,448,953

UNITED STATES PATENT OFFICE.

LOUIS C. CRESCIO, OF NEW YORK, N. Y., ASSIGNOR OF ONE-HALF TO LOUIS MALATESTA, OF NEW YORK, N. Y.

LOCKING DEVICE.

Application filed September 14, 1921. Serial No. 500,678.

*To all whom it may concern:*

Be it known that I, LOUIS C. CRESCIO, a citizen of the United States, and resident of 7 Sixth Ave., New York city, in the county of New York and State of New York, have invented certain new and useful Improvements in Locking Devices, of which the following is a specification.

This invention relates to frictional locking devices in general, and particularly to the kind adaptable to micrometer spindles, or spindles of other fine measuring instruments.

The prime object of my invention is to provide a device of this kind whereby the operation of the spindle may not be impaired in any way or manner by the locking thereof.

Another object of my invention is to provide a device which will, without impairing the operation of the spindle, positively lock the same uniformly at all points of the entire locking surface of my device.

A further object of my invention is to provide a positive locking device adapted to uniformly, concentrically, and simultaneously lock an annular object against turning at all points of the surface of the device coming in contact with the object to be locked.

A further object of my invention is to provide in connection with such locking means, a dust proofing device or devices adapted to prevent foreign matter from entering not only the locking device, but also from coming in contact with the object to be clamped.

I am aware of the existence of various locking devices, adapted to accomplish similar results. All of them, however, have the disadvantage of engaging the object to be locked with only a small portion of their surfaces, and not uniformly at all points of their contacting faces.

There are other locking devices for locking the spindle, for instance, of a micrometer caliper, which engage the latter through an eccentric movement. There are still other locking devices of different construction designed for the similar purpose. None of them, however, accomplish the improved results I derive from the peculiar construction of the elements involved in the present invention.

In describing the general principle of my invention, I employ a substantially stationary and a movable or closing member, said members conically inter-engaged with each other, the stationary or friction member being of a general conical shape and provided with longitudinal incisions alternately opened at one face and closed at the other face of the friction member. It is immaterial whether these incisions are made strictly longitudinally or in an oblique fashion or cut on a helix; the principal object being to partially split the friction member from both ends, while leaving it completely united.

When now the internally cone shaped closing member moves upon the cone of the friction member, it causes the latter to either uniformly contract or expand, depending whether the members move—so to speak—toward or from each other.

Due to this peculiar construction, the frictional engagement, between the friction member and the object to be locked against movement of the latter, is uniform over the entire contact surface between the friction member and the object, thereby becoming absolutely positive.

Moreover, the friction member does not in any way injure the clamped object, and it does not throw the same out of its original alinement, which is of vital importance particularly in connection with the shaft of a micrometer caliper, or other very fine measuring instruments.

In order to better understand my invention and its further objects involved, reference is made to the accompanying drawing, forming part of this specification, in which:—

Fig. 1 represents a preferred form of my locking device in longitudinal cross section.

Figs. 2, 3, and 4 are similar views of a few of the many possible modifications.

Fig. 5 is a side elevation of one preferred form of my conical member.

Fig. 6 is a side elevation of a modified form thereof.

Figs. 7 and 8 are other modified forms of my conical friction member, corresponding with the illustrations in Figs. 2 and 3, respectively.

Fig. 9 represents a preferred form of a closing cap of my dust proofing arrangement.

Referring to the drawings, numeral 10 represents an annular object, for instance a spindle of a micrometer caliper, adapted to be clamped. In Fig. 1 there is shown a frame 11 having two upright bearing extensions 12 and 13, separated by a recessed portion 14.

The extension 12 possesses a threaded aperture, the threads 15 of which register with the threads of a barrel member 16. The threaded end of the barrel member protrudes into the recess 14, and is adapted to be engaged by an annular closing member 17, having a threaded portion 18 and an internally cone shaped aperture 19.

Secured by lug 20 in a slot 21 provided in frame upright 13 against rotary motion, is a cone shaped member 22, as shown in detail in Figs. 5 and 6.

The friction member is divided into a plurality of sections by substantially longitudinal incisions 23 and 24. Each of these incisions is open at one face or end of said friction member, while it is closed at the oppositely disposed end thereof.

These incisions are disposed alternately, so that one incision is open at one end and the next incision at the other face of the friction member. In this manner, a very flexible unitary article is produced which will, when circumferentially compressed, uniformly reduce its circumference—is the distance or spaces between the sections will be uniformly reduced.

The bevel of the cone of the friction member corresponds with the internal bevel 19 of the closing member 17. Friction member 22 is adapted to engage with its entire inner annular surface, the spindle 10. Thus a complete frictional engagement takes place when member 17 is moved in the direction toward the frame extension 13. In other words, its inner bevel moves against the bevel of the friction member 22. When moving in opposite direction, that is when the two members—so to speak—move from each other by reversing the turning motion of closing member 17, friction member 22 releases spindle 10.

Barrel member 16 shows at 25 a bearing for spindle 10, while in the frame extension 13 there is provided another bearing indicated at 26.

Adjacent thereto is an annular recess 27 provided in frame member 13, having an internal annular groove indicated at 28. Adapted to register with the recessed portion 27 is a closing member or cap 29, comprising an annular ring-shaped portion 30, provided with an aperture 31 for receiving and facilitating the free passage therethrough of spindle 10.

Extending from ring member 30 is a substantially cylindrically shaped portion 32, provided with an annular bead 33 at its outer circumference. This bead is adapted to engage groove 28, when the cap is inserted into recess 27.

As may be seen in Fig. 1, the space between the ring-shaped portion of the cap, the spindle 10 and the bearing 26, is filled with the packing material indicated at 34. This packing material is not only compressed, but also firmly held in place by the cap when the bead of the latter engages the groove 28 of frame member 13.

A detail side elevation of the cap is shown in Fig. 9 in one of its preferred forms wherefrom the remaining features of its design may be ascertained.

It will be seen that the cylindrical portion 32 is slotted as indicated at 35 to permit the thus-formed sections of the cylindrical portion to enter recess 27 of frame member 13 and to facilitate the locking of bead 33 in recess 28. It is evident that the cylindrical portion of the cap 29 is to be sufficiently resilient to permit the sections produced by slots 35 to spring into their normal position once the cap has reached its proper place.

The packing material compressed and held in place by cap 29 prevents dust from entering bearing 26 of spindle 10. In order to minimize the danger of dust entering the clamping device, an annular ring indicated at 36 and passing from bearing member 13 over extension 37 of closing member 17, is provided, thus closing the free space 38 between the bearing member 13 and closing member 17.

Similar in construction and operation to the design shown in Fig. 1 are the constructions disclosed in Figs. 2, 3, and 4, with the difference that closing members 17′, 17″, and 117 engage with their threaded extensions 18′, 18″, and 118, the corresponding threaded portions 39, 39′, and 39″ of the friction members 19′, 19″, and 119.

In all of these modified designs there are provided two lugs 20′ and 40 held in corresponding recesses within frame extensions 12′ and 13′ (Figs. 2 and 3) and 112 and 113 (Fig. 4).

Friction members 19′, 19″ and 119 are slotted in a similar manner as are the friction members shown in Figs. 5 and 6, the incisions not only being provided through the conical surface, but extending also into the threaded portion of the friction members.

In order to facilitate the turning of the closing members, the outer annular extension thereof is provided with a knurled or other convenient gripping means, as indicated at 41. In Figs. 2, 3, and 4, the dust-proofing member for the outer bearing is omitted for simplicity's sake. Be it understood, however, that such dust-proofing arrangement may be readily provided as is shown in Fig. 1.

While I have shown only a few modified forms of my device, it will be readily seen that various modifications and improvements may be made in the course of manufacture, and I therefore reserve for myself the right to make such improvements and changes which may become necessary.

I also wish it to be understood that while I have shown constructions similar to that found in micrometer calipers, my device may be applicable not only in the line of measuring instruments, but in any other connection where positive frictional locking engagement for preventing motion is required.

Having thus described my invention, I claim:—

1. In an annular locking device comprising internal and external conically interengaged members adapted to move in longitudinal direction toward or from each other for uniformly, frictionally engaging or releasing, respectively, an article; a dust-proofing device comprising a generally cup-shaped unit for receiving a packing element and composed of rigid and compressible portions, the latter provided with locking means adapted to keep such device in desired relation relative to such article.

2. In a frictional locking device, comprising internal and external conically interengaged members, adapted to move in longitudinal direction toward or from each other, said internal member adapted to be uniformly compressible over its entire length by said external member; a dust-proofing device comprising a generally cup-shaped unit having rigid and compressible parts, means provided at the latter for keeping it in proper relation relative to said locking device.

3. In a frictional locking device comprising an internal friction member adapted to uniformly expand or contract over its entire length and over its circumference, an external member conically engaging said internal member and adapted to move in longitudinal direction relative to said member; a dust-proofing device comprising a generally cup-shaped member for receiving a packing and composed of a rigid portion and in continuation thereof a portion provided with a plurality of slots, locking means associated with said slotted portion adapted to keep said dust-proofing device in desired relation to said frictional locking device.

4. In a frictional locking device, comprising an internal, uniformly expandible and uniformly contractable friction member adapted to frictionally engage or release an annular object, an actuating member in conical engagement with said frictional member and adapted to exert pressure or release said latter member while moving in longitudinal relation thereto, and means for preventing said friction member from turning, a dust-proofing device comprising a generally cup-shaped member for receiving a packing element, the latter adapted to bear against said annular object, said cup-shaped member composed of an annular rigid part and an annular slotted portion, locking means provided with the latter and adapted to prevent the movement of said dust-proofing device relative to said annular object.

5. In a friction locking device, comprising an internal friction member of generally conical shape, adapted to uniformly contract and expand, and having a plurality of incisions alternately open at one end and closed at the other end, and means for preventing the rotation of said member; a generally cup-shaped dust-proofing member having a knurled rigid portion and a cylindrical extension provided with a plurality of slots, a locking bead provided near the end of the slotted portion adapted to keep said dust-proofing member in desired relation to said frictional locking device.

6. In combination with a frictional locking device for cylindrical objects, a dust-proofing arrangement comprising a generally cup-shaped member for receiving a packing element, the latter adapted to bear against said object, said cup-shaped member composed of a rigid annular portion and a compressible slotted portion, locking means associated with the latter and adapted to keep said cup-shaped member in desired relation with said cylindrical object.

7. In combination with a frictional locking device for a cylindrical object having a frame member adapted to rotatably lodge said object, a dust-proofing arrangement adapted to be associated with said frame member, and comprising a packing disposed around said object, a cap, having an aperture for permitting said object to pass therethrough, adapted to receive and press said packing against said object, a peripheral bead integral with said cap and adapted to interlock with said frame member while pressingly engaging said packing.

8. A dust-proofing arrangement in combination with frictional locking devices for spindles, having a frame, comprising a spindle bearing forming part of the frame, an annular enlargement within the frame adjacent to said bearing, an annular groove provided within said enlargement, a packing adapted to surround a spindle and to fill the space within the enlargement, a cap adapted to keep said packing in place and comprising an annular ring-shaped portion, a cylindrical portion, an annular bead provided upon the latter's outer surface, and adapted to engage said annular groove, a plurality of incisions provided in said cylindrical portion for facilitating the engagement of said annular groove by said bead when said cap is passed into said annular enlargement.

9. In a dust-proofing arrangement for frictional spindle locking devices, a cap comprising a ring-shaped portion, a cylindrical portion extending therefrom, longitudinal slots formed in said cylindrical portion, extending in the direction from the latter's edge toward said ring portion, an annular bead provided upon the outer surface of said cylindrical portion, and sectioned by said slots.

Signed at New York, in the county of New York and State of New York, this 31st day of August, A. D. 1921.

LOUIS C. CRESCIO.